United States Patent
Grundmann et al.

(10) Patent No.: US 12,548,819 B2
(45) Date of Patent: Feb. 10, 2026

(54) METHOD FOR COOLING A BATTERY OF A MOTOR VEHICLE, COOLING ARRANGEMENT, AND MOTOR VEHICLE

(71) Applicant: AUDI AG, Ingolstadt (DE)

(72) Inventors: Tammo Grundmann, Ingolstadt (DE); Carsten Lorenz, Reichertshofen (DE); Paul Schneider, Großmehring (DE)

(73) Assignee: AUDI AG, Ingolstadt (DE)

( * ) Notice: Subject to any disclaimer, the term of this patent is extended or adjusted under 35 U.S.C. 154(b) by 108 days.

(21) Appl. No.: 18/699,446

(22) PCT Filed: Sep. 30, 2022

(86) PCT No.: PCT/EP2022/077256
§ 371 (c)(1),
(2) Date: Apr. 8, 2024

(87) PCT Pub. No.: WO2023/061771
PCT Pub. Date: Apr. 20, 2023

(65) Prior Publication Data
US 2025/0239676 A1    Jul. 24, 2025

(30) Foreign Application Priority Data
Oct. 13, 2021   (DE) .......................... 102021126467.7

(51) Int. Cl.
*H01M 10/625* (2014.01)
*B60R 16/033* (2006.01)
(Continued)

(52) U.S. Cl.
CPC ......... *H01M 10/625* (2015.04); *B60R 16/033* (2013.01); *B60R 16/08* (2013.01);
(Continued)

(58) Field of Classification Search
CPC ............. H01M 10/625; H01M 10/613; H01M 10/633; H01M 10/6568; B60R 16/033; B60R 16/08
See application file for complete search history.

(56) References Cited

U.S. PATENT DOCUMENTS

| | | | |
|---|---|---|---|
| 2010/0136391 A1* | 6/2010 | Prilutsky | H01M 10/6566 429/62 |
| 2011/0111269 A1 | 5/2011 | Tse | |

(Continued)

FOREIGN PATENT DOCUMENTS

| | | | | |
|---|---|---|---|---|
| CN | 111952692 A | * | 11/2020 | ........ H01M 10/6571 |
| CN | 112038560 A | * | 12/2020 | ............... A62C 3/16 |

(Continued)

OTHER PUBLICATIONS

International Preliminary Report on Patentability issued on Apr. 25, 2024, in corresponding International Application No. PCT/EP2022/077256, 7 pages.

(Continued)

*Primary Examiner* — Nelson J Nieves
(74) *Attorney, Agent, or Firm* — Maier & Maier, PLLC

(57) ABSTRACT

A method for cooling a battery of a motor vehicle, which includes multiple battery cells, by a cooling device through which a coolant can flow, as part of at least one cooling circuit through which the coolant can flow, which includes at least one coolant pump, which in an active state circulates the coolant present in at least one cooling circuit in the cooling circuit. In particular, a control device controls at least one coolant pump depending on a detection of a faul state which is connected to a thermal runaway of at least one of the battery cells of the battery, such that the at least one coolant pump is activated or continues to be operated in the active state when the faul state is detected.

20 Claims, 2 Drawing Sheets

(51) Int. Cl.
  *B60R 16/08* (2006.01)
  *H01M 10/613* (2014.01)
  *H01M 10/633* (2014.01)
  *H01M 10/6568* (2014.01)
(52) U.S. Cl.
  CPC ....... *H01M 10/613* (2015.04); *H01M 10/633* (2015.04); *H01M 10/6568* (2015.04); *H01M 2220/20* (2013.01)

(56) References Cited

U.S. PATENT DOCUMENTS

| | | | | |
|---|---|---|---|---|
| 2013/0071701 | A1* | 3/2013 | LePort | H01M 10/625 429/50 |
| 2020/0406784 | A1* | 12/2020 | Yoshida | B60K 1/00 |
| 2021/0053689 | A1* | 2/2021 | Lynn | B64D 33/08 |
| 2022/0367931 | A1* | 11/2022 | Niu | B60L 58/26 |
| 2024/0072373 | A1* | 2/2024 | Werner | H01M 50/383 |
| 2024/0243388 | A1* | 7/2024 | Diny | H01M 10/6568 |
| 2025/0055072 | A1* | 2/2025 | Wang | H01M 10/637 |
| 2025/0070302 | A1* | 2/2025 | Chagarlamudi | H01M 10/625 |

FOREIGN PATENT DOCUMENTS

| | | | | |
|---|---|---|---|---|
| CN | 112510289 | A | 3/2021 | |
| CN | 112582740 | A * | 3/2021 | ........ H01M 10/6568 |
| CN | 113422125 | A | 9/2021 | |
| DE | 202007011578 | U1 | 10/2007 | |
| DE | 102016200368 | A1 | 7/2017 | |
| DE | 102020104892 | A1 | 8/2021 | |
| EP | 2302727 | A1 * | 3/2011 | .......... H01M 50/609 |
| WO | 2023061771 | A2 | 4/2023 | |

OTHER PUBLICATIONS

Search Report issued on Mar. 30, 2023, in corresponding International Application No. PCT/EP2022/077256, 24 pages.
Search Report issued on Jun. 13, 2022, in corresponding German Application No. 10 2021 126 467.7, 12 pages.

* cited by examiner

METHOD FOR COOLING A BATTERY OF A MOTOR VEHICLE, COOLING ARRANGEMENT, AND MOTOR VEHICLE

FIELD

The invention relates to a method for cooling a battery of a motor vehicle, which comprises a plurality of battery cells, by means of a cooling device through which a coolant can flow as part of at least one cooling circuit through which the coolant can flow, which comprises at least one coolant pump, which in an active state circulates the coolant present in at least one cooling circuit. Furthermore, the invention also relates to a cooling arrangement as well as to a motor vehicle.

BACKGROUND

It is known from the prior art that batteries of motor vehicles, in particular high-voltage batteries, can be cooled by a cooling device. Such a cooling device can, for example, be designed as a cooling base on which the battery cells of the high-voltage battery or the battery modules are arranged. Such a cooling device is also often designed as a metallic cooling plate, which includes cooling channels through which the coolant can flow. In order to enable heat dissipation to be as efficient as possible, the battery cells or battery modules can also be connected to this cooling plate via, for example, a thermal paste or a highly thermally conductive adhesive. If a so-called thermal runaway, namely a thermal spiraling out, occurs in a battery cell, this battery cell heats up very strongly. As a result, very high temperatures occur in this cell. If this heat is transferred to neighboring cells, they also heat up, which in turn can trigger thermal runaway of these neighboring cells. This can ultimately lead to a chain reaction, a so-called thermal propagation, in which all cells of the high-voltage battery undergo thermal runaway. This often results in the battery bursting into flames. To prevent this, the heat conduction paths to neighboring cells would have to be blocked. So far, attempts have been made to achieve this using appropriate thermally insulating cell intermediate materials. But the cells are also coupled to each other in other ways. For example, these are electrically interconnected via cell connectors, so that these cell connectors also provide a very good thermally conductive path between the cell poles of adjacent cells. The cells are also thermally coupled to one another via the metallic cooling plate described above.

Another problem in the event of a thermal runaway is that when such a faul state is detected, the high-voltage on-board electrical system, which is supplied with energy by the battery during normal operation, is deactivated and the battery is immediately decoupled from the rest of the high-voltage on-board electrical system. This means that active cooling, according to which the coolant is actively cooled by a refrigeration circuit, is no longer available for the battery. According to the prior art, attempts are therefore made to prevent thermal propagation or to extinguish a battery fire using special extinguishing devices.

For example, DE 10 2016 200 368 A1 describes a battery system with a battery module and a coolant circuit system with at least one coolant container and a coolant line that partially extends through the battery module, wherein the coolant line has an emergency opening in the battery module that is closed by an actuating element, which is designed as a pressure-sensitive actuating element, which opens at a pressure greater than a threshold value and releases the emergency opening. Furthermore, the coolant container has a connection for an extinguishing agent hose or an interface for attaching a connection for an extinguishing agent hose. If an extinguishing agent hose is connected to the connection and extinguishing agent is filled in, this leads to increased pressure in the coolant circuit system, which opens the emergency opening in the battery module and allows the coolant to flow into the battery module.

Furthermore, DE 20 2007 011 578 U1 describes an air conditioning system and an energy storage, the air conditioning system having a circulation medium which is accommodated in a container, the circulation medium being at least partially derivable from the container by a control device and being fed to the energy storage in order to be used as an extinguishing agent for a fire in the energy storage.

However, these measures are very complex and only conditionally effective.

SUMMARY

It is therefore the object of the present invention to provide a cooling arrangement and a motor vehicle which allow to block or at least delay a thermal propagation within a battery as efficiently as possible and in the simplest possible manner.

This object is achieved by a method, a battery arrangement and a motor vehicle.

In a method according to the invention for cooling a battery of a motor vehicle, which battery comprises a plurality of battery cells, by means of a cooling device through which a coolant can flow as part of at least one cooling circuit through which the coolant can flow, which comprises at least one coolant pump which, in an active state, circulates the coolant present in the at least one cooling circuit within the cooling circuit, a control device controls the at least one coolant pump depending on a detection of a faul state that relates to a thermal runaway of at least one of the battery cells of the battery, so that the at least one coolant pump is activated or continues to be operated in the active state, when the faul state is detected.

The coolant pump can therefore be activated if it is in the inactive state at the time the faul state is detected or, if it is already in the active state, it can remain activated or can also be initially deactivated and then reactivated. The invention is based on the knowledge that, although in the event of a cell thermally running away, active cooling can no longer be provided due to the shutdown of the high-voltage system and, as a result, to the shutdown of an air conditioning compressor or other components, for example, so that an active cooling of the coolant can also no longer be provided, the coolant pump in the cooling circuit, which can be powered by the low-voltage vehicle electrical system, can still continue to operate or can be transferred into the active state. The coolant circulated in the cooling circuit can then no longer be actively cooled down, but by operating the coolant pump it can be achieved that the heat given off locally to the cooling device by the thermal runaway battery cell can be transported away from this hot-spot region and can be absorbed by other components of the cooling system, such as by the coolant itself, and other components coupled to the cooling circuit. As a result, the amount of heat that is transferred from the thermal runaway cell to neighboring cells, in particular via the cooling device, can be significantly reduced. By activating the coolant pump or its operation when such a faul state is detected, the cooling medium, i.e. the coolant, can be circulated in order to specifically transport and distribute the heat away from this hot-spot region. This means that the thermal capacity of the cooling system as a whole can be used to absorb and dissipate the heat and thereby prevent or at least significantly delay thermal propagation. In other words, the existing thermal capacity of the cooling medium, for example the cooling device designed as a cooling plate, and of other components can be used to absorb as much thermal energy as possible. This effect ensures that only a small amount of heat is introduced into the neighboring cells, but this is no longer sufficient to trigger a thermal runaway in the next cell.

The battery can be, for example, a high-voltage battery of a motor vehicle. The battery can comprise multiple battery cells which can be formed, for example, as lithium-ion cells. The battery can comprise multiple battery modules, each of which in turn comprises multiple battery cells. As described above, the cooling device can be designed, for example, as a cooling base or cooling plate. Preferably, the cooling device comprises cooling channels through which the coolant can flow. The cooling device can be designed, for example, as a metallic plate with cooling channels. The cooling device can also be part of a battery housing of the battery, for example. For example, the cooling device can be designed as a cooling base of such a battery housing. The battery cells can be connected to the cooling device via a thermally conductive compound or a thermally conductive adhesive. The coolant can be, for example, water or a water-glycol mixture.

The coolant pump can generally have at least one active and one inactive state. When the coolant pump is in the inactive state, the coolant in the cooling circuit is not actively pumped through it and therefore does not circulate, but rather stands still in the cooling channels and lines. If the coolant pump is activated, it pumps the coolant through the cooling circuit, causing it to circulate in the cooling circuit. The cooling circuit can also have a coolant reservoir for providing the coolant. It is also conceivable that the coolant pump also has different operating stages in the active state, for example to adjust the pump performance. The control device is designed to control the coolant pump. The control device in the context of the present invention can also be understood as a group of many individual control units. In other words, the control functions described in connection with the control device do not have to be implemented by, for example, a single controller or control device, but can be distributed across many different controllers or control devices. The coolant pump itself can also have, for example, a specially assigned control unit, as can the battery, for example. The control device can also be designed to detect the faul state mentioned. For this purpose, the control device can also be designed to receive a detection signal from a detection device that detects the faul state. There are several different options for detecting such a faul state, such as detecting whether a certain temperature threshold value has been exceeded by a detected temperature of the battery cells, detecting certain electrical variables, for example detecting a voltage drop of a cell voltage, detecting outgassing of the battery cell by means of a gas sensor or a pressure sensor in the battery, and so on. If such a faul state, which is related to or represents a thermal runaway of at least one battery cell, is detected, the control device can accordingly control the coolant pump in order to activate it. If the coolant pump is already in the active state, it can continue to operate accordingly, even if, for example, the high-voltage on-board electrical system is also switched off. It is also conceivable that, as is usual when a faul state is detected, the cooling is first deactivated and in this context the coolant pump is also initially switched off as before, and then activated again by activation by the control device.

In a very advantageous embodiment of the invention, the control device and the at least one coolant pump are supplied with energy in the active state from an on-board low-voltage electrical system of the motor vehicle. The on-board low-voltage electrical system can be assigned its own energy storage, for example a second battery, which can be designed, for example, as a 12-volt battery. This makes it advantageously possible to operate the control device and the coolant pump independently of the functionality of the battery, in particular the high-voltage battery.

According to a further advantageous embodiment of the invention, the battery is designed to supply energy to a high-voltage on-board electrical system of the motor vehicle in at least one operating state that is different from the faul state, wherein the control device controls the at least one coolant pump for activation or continued operation when a faul state is detected, regardless of a current activation state of the high-voltage on-board electrical system. This advantageously allows the coolant pump to be operated to circulate the coolant, even if the high-voltage on-board electrical system is no longer active and therefore also the active cooling of the coolant can no longer be provided. As already described above, the knowledge is used here that a certain cooling effect can still be achieved in that, through the operation of the coolant pump, the coolant can transport the heat generated in the region of the thermal runaway cell away from this region in order to distribute it to other components and their thermal capacities.

Accordingly, it also represents a further advantageous embodiment of the invention that the control device deactivates the high-voltage on-board electrical system depending on a detection of a faul state, in particular by activating a disconnecting device for electrically disconnecting the battery from the high-voltage on-board electrical system when the faul state is detected. Disconnecting the battery from the rest of the high-voltage on-board electrical system in the event of a cell thermal runaway increases safety. If the battery instead continued to supply the high-voltage on-board electrical system with energy, this would only further promote thermal runaway of the cell in question and of the neighboring cell. Despite the high-voltage on-board electrical system being disconnected, the invention can still provide a cooling effect through the cooling circuit when the coolant pump is activated.

In a further advantageous embodiment of the invention, the control device couples at least one component that can be coupled to the at least one cooling circuit to the at least one cooling circuit in the event of the faul state being detected, so that more heat can be transferred to the at least one component by the coolant which circulates in the at least one cooling circuit than in the uncoupled state.

This is based on the knowledge that not only the battery but also other components can typically be cooled during normal operation via such a cooling circuit. Depending on the current cooling requirements of the individual components, they can be coupled to or decoupled from the cooling circuit. This can be achieved, for example, by appropriate valve control and by providing appropriate cooling circuit branches. The thermal capacities of these additional components can now also be advantageously used to absorb the heat given off by the thermal runaway cell in case of an emergency. For this purpose, such a component can thus be actively coupled to the cooling circuit when the faul state is detected, in particular regardless of the current cooling requirement of this component. This means that the coolant, which is circulated by the pump through the cooling circuit in the event of a faul state, can also give off heat to such other components. In principle, this can be any component of the motor vehicle that can be coupled to the cooling circuit, be it a battery component or a component outside the battery or the battery system, for example a high-voltage component. If necessary, not only one such component can be coupled to the cooling circuit, but also several or all of those that can be coupled to the cooling circuit. Overall, an enormously large thermal mass can be provided to which the thermal energy can be transferred.

In a further very advantageous embodiment of the invention, the control device couples the at least one component that can be coupled to the at least one cooling circuit in the event of the detection of the faul state depending on a current temperature of the at least one component to the cooling circuit only if heat generated by the at least one component can be absorbed by the coolant, especially if the current temperature of the component meets a predetermined criterion. This can, for example, consist in the current temperature of the at least one component being smaller than a current temperature of the coolant, in particular the temperature of the coolant in a specific region of the cooling circuit associated with the component. If the pump is actively operated and thereby circulates the coolant, over time, without active cooling, an almost identical coolant temperature will set in throughout the entire cooling circuit. The temperature of the coolant can be detected at one or more points using suitable temperature sensors. The at least one component can also have such a temperature sensor. During normal operation, the temperature of the component can be used, for example, to adjust the cooling capacity for the at least one component or to activate or deactivate it as required. In the present case, the current temperature of the component can advantageously be used to decide whether it can absorb heat from the cooling circuit at all. For example, if the motor vehicle is currently at a standstill or has already been at a standstill for a long time, the motor vehicle components are significantly cooler compared to a thermal runaway cell and correspondingly also compared to the coolant temperature, so that these components can advantageously be coupled to the cooling circuit in order to absorb additional heat from the cooling circuit. If a component in question is very hot due to its previous operation, it can advantageously be dispensed with coupling it to the cooling circuit in order not to introduce additional heat energy into the cooling circuit. This means that the most efficient solution for heat dissipation can be chosen depending on the situation. Individual components that can be separately coupled to the cooling circuit can also be assigned individual temperature sensors, so that for each of these components it can be decided individually, depending on their assigned temperature, whether they are currently suitable for absorbing heat from the cooling circuit or not and this component can accordingly be selectively coupled to the cooling circuit.

In a further advantageous embodiment of the invention, the control device couples the at least one component, in the event of detection of the faul state, to the at least one cooling circuit by controlling at least one first valve device, so that this valve device is in a first state in which a cooling circuit part of the at least one cooling circuit assigned to the component is passed through by the coolant, when the at least one coolant pump is active. In other words, the relevant component can be coupled to the cooling circuit simply by opening a valve that is assigned to a component or to the cooling circuit part to which the component is assigned. This means that the component and, for example, the cooling device for the battery are located in different and therefore separately controllable cooling circuit branches of the cooling circuit.

Additionally or alternatively, it is also conceivable that the component is located in a separate cooling circuit, which can be fluidically or thermally coupled to the cooling circuit in which the cooling device for the battery is located. Accordingly, it represents a further advantageous embodiment of the invention if the at least one cooling circuit has a first cooling circuit, which includes the cooling device, and a second cooling circuit, to which the at least one component is assigned, wherein the control device couples the at least one component in case of detection of a faul state, to the at least one cooling circuit by controlling at least one second valve device, so that this valve is in a first state in which the first and second cooling circuits are fluidly connected to one another. A fluid connection can also be easily established between separate cooling circuits, for example by opening a valve. This means that the thermal capacity provided by other cooling circuits can also be used to absorb heat from the thermally propagating cell. In addition to establishing a fluid connection between different cooling circuits by opening valve devices, there are also other coupling options between different cooling circuits, for example purely thermal coupling options, for example via heat exchangers.

Different cooling circuits, for example, in contrast to different cooling circuit branches, can be understood as meaning cooling circuits that each have their own circuit components, such as a pump, in particular the at least one coolant pump, and a coolant reservoir, while different cooling circuit branches can use common components, for example a common coolant pump and a common coolant reservoir.

The invention and its embodiments therefore make it possible to continue to use numerous existing components in a cooling circuit, as well as existing circuit topologies, and to implement an advantageous, adapted control strategy in order to transfer the heat from the thermal runaway cell to other regions of the motor vehicle, in a particularly efficient manner.

Furthermore, the invention also relates to a cooling arrangement for cooling a battery for a motor vehicle, wherein the cooling arrangement has the battery, which comprises a plurality of battery cells, and a cooling circuit through which a coolant can flow, wherein the cooling circuit comprises a cooling device through which the coolant can flow for cooling the battery and at least one coolant pump, which is designed to circulate a coolant located in the cooling circuit in the cooling circuit when the at least one coolant pump is in an active state. In addition, the cooling arrangement comprises a control device for controlling the at least one coolant pump, wherein the control device is designed to detect a faul state connected with a thermal runaway of at least one of the battery cells of the battery and to control the at least one coolant pump, in particular independently of an activation state of a high-voltage on-board electrical system of the motor vehicle, in such a way that the pump is activated in the event of a faul state being detected or continues to be operated in the active state.

The advantages described for the method according to the invention and its embodiments thus apply similarly to the cooling arrangement according to the invention.

Furthermore, the invention also relates to a motor vehicle having a battery arrangement according to the invention or one of its embodiments.

The control device can have a data processing device or a processor device which is set up to perform an embodiment of the method according to the invention. For this purpose, the processor device can have at least one microprocessor and/or at least one microcontroller and/or at least one FPGA (Field Programmable Gate Array) and/or at least one DSP (Digital Signal Processor). Furthermore, the processor device can have program code which is configured to carry out the embodiment of the method according to the invention when it is executed by the processor device. The program code can be stored in a data memory of the processor device.

The invention also includes developments of the cooling arrangement according to the invention, which have the features which have already been described in conjunction with the developments of the method according to the invention. For this reason, the corresponding developments of the cooling arrangement according to the invention are not described again here.

The motor vehicle according to the invention is preferably designed as an automobile, in particular as a passenger car or truck, or as a passenger bus or motorcycle.

The invention also comprises the combinations of the features of the described embodiments. The invention therefore also comprises implementations that respectively have a combination of the features of multiple of the described embodiments, provided that the embodiments have not been described as mutually exclusive.

BRIEF DESCRIPTION OF THE FIGURES

Exemplary embodiments of the invention are described hereinafter. In particular.

DETAILED DESCRIPTION

Figure 1:
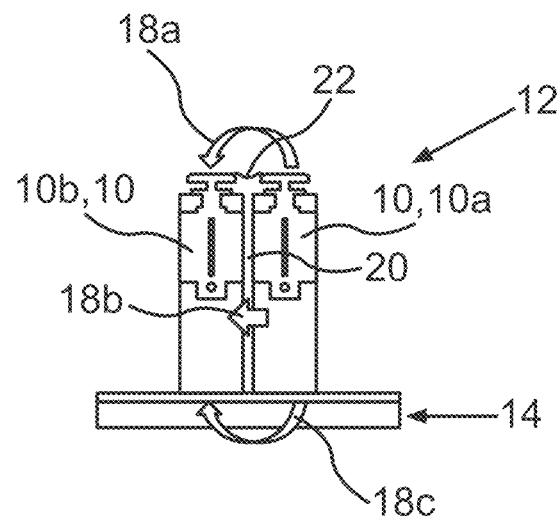
FIG. 1 shows a schematic representation of two battery cells of a battery on a cooling device.

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, the same reference numerals respectively designate elements that have the same function.

FIG. 1 shows a schematic representation of two battery cells 10 of a battery 12 on a cooling device 14 as part of a cooling arrangement 16 (see FIG. 2) according to an exemplary embodiment of the invention. The cooling device 14 can be designed, for example, as a cooling plate 14 through which a coolant can flow. The illustration in FIG. 1 serves primarily to illustrate various thermal paths 18a, 18b, 18c, via which energy, in particular thermal energy, can pass from one battery cell 10 to another cell 10. For example, if a thermal event occurs in one of the battery cells 10, as in the present example in battery cell 10a in FIG. 1, the cell heats up very strongly. The heat generated in the cell 10a can propagate via the various paths 18a, 18b, 18c to an adjacent cell 10b. In order to prevent such propagation, attempts have so far been made to thermally isolate the cells from one another, for example by providing a cell intermediate material 20 between the cells 10, which material has a high thermal resistance. In principle, this makes it possible to increase the thermal resistance of the second transmission path 18b, but this normally cannot provide sufficient thermal decoupling of the cells to prevent thermal propagation. This is due to the fact that the cell poles of the cells 10 are also electrically connected to one another via cell connectors 22, so-called busbars, which also provide good thermal coupling of the cell poles, which forms the first thermal path 18a shown in FIG. 1. In addition, the cooling plate 14 is also made of metallic material and therefore has very good thermal conductivity, which also ensures very good thermal coupling between the cells 10 via the third path 18c in the inactive state of the cooling.

Figure 2:
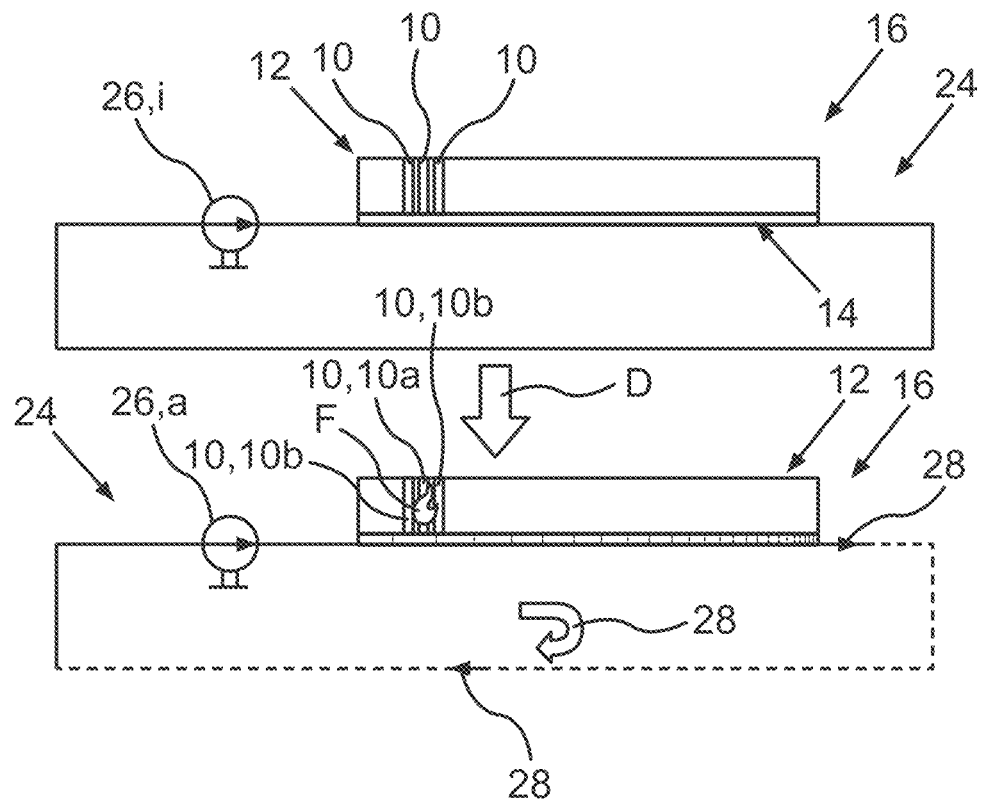
FIG. 2 shows a schematic representation of a cooling circuit of a cooling arrangement according to an exemplary embodiment of the invention in the inactive and active state.

The invention and its embodiments now advantageously make it possible, above all, to significantly reduce heat transfer via this last-mentioned third thermal path 18c, and indirectly also via the path 18a. This will now be explained in more detail below. For this purpose, FIG. 2 shows a schematic representation of a cooling device 16, at the top in the inactive state and at the bottom again in the active state. Basically, the cooling arrangement 16 has the battery 12, which in turn can comprise several battery cells 10, of which only three are illustratively shown for reasons of clarity. Furthermore, the cooling arrangement 16 again comprises a cooling device 14, as the one which has already been described for FIG. 1. In addition, the cooling arrangement 16 has a cooling circuit 24. A coolant can be circulated in this. In order to move the coolant through the cooling circuit 24, the cooling circuit 24 comprises a coolant pump 26. If this is inactive, as in the upper representation in FIG. 2, the coolant stands still within the lines, pipes and channels of the cooling circuit 24. The inactive state of the coolant pump 26 is denoted by i in the present case. If a faul state F occurs that involves thermal runaway of one of the battery cells 10, as shown below in FIG. 2, the coolant pump 26 is activated and thus transferred to its active state a. As a result, the coolant is now circulated in the cooling circuit 24, which is illustrated by the arrow 28. Thus follows a circulation of the coolant. The detection of faul state F is illustrated by arrow D. In other words, the detection D of such a faul state F leads directly to the activation of the coolant pump 26.

There is no active cooling by means of the coolant. This is due to the fact that, along with the detection D of faul state F, the high-voltage on-board electrical system of the motor vehicle is also deactivated, as a result of which the electric air conditioning compressor is also deactivated. Until now, it has been incorrectly assumed that cooling of the battery 12 is thus no longer possible. However, the coolant pump 26 as well as a control device (not shown here) for activating the pump 26 can be supplied with energy via a low-voltage on-board electrical system of the motor vehicle, so that operation of the pump 26 is also possible even if the battery 12 is decoupled from the rest of the on-board electrical system. In addition, the circulation of the coolant made possible by the activation of the pump 26 causes the existing thermal capacity of the coolant itself as well as of the cooling plate and other components coupled to the cooling circuit 24 to continue to be used in order to absorb as much thermal energy as possible. This effect ensures that only a small amount of heat is introduced into the neighboring cells 10b and this is therefore no longer sufficient to trigger a thermal runaway of these neighboring cells 10b. Thus, the heat given off by the thermal runaway cell 10a, as illustrated for example in FIG. 1, can be removed from this temperature hot-spot very quickly by the flowing coolant, even if the coolant itself can no longer be cooled. The heat transfer via the third path 18c is thereby significantly reduced. Due to the improved heat dissipation, less heat also passes through the first path 18a. Instead, the heat is absorbed by the coolant, transported further and distributed to other components, for example it can also be absorbed by the cooling plate 14 itself, but distributed much better and more homogeneously over the entire cooling plate, and it can be absorbed and distributed by the coolant itself, for example also to other battery components, such as control devices or similar. Other components, for example other high-voltage components of the vehicle, can also be actively integrated into the cooling circuit in order to be able to transfer additional heat to them. This is illustrated again in particular in FIG. 3.

Figure 3:
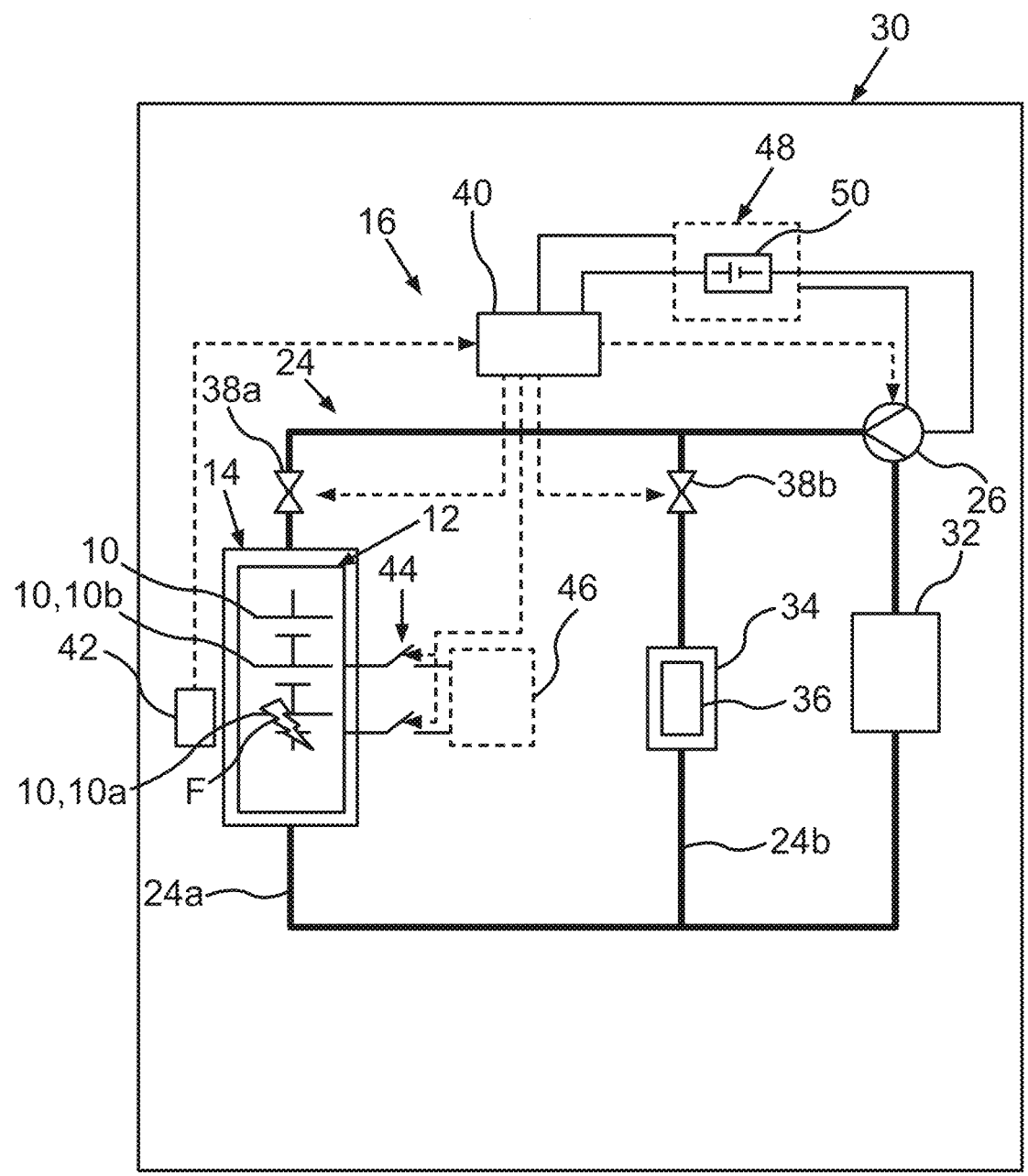
FIG. 3 shows a schematic representation of a motor vehicle having a cooling arrangement according to a further exemplary embodiment of the invention.

FIG. 3 shows a schematic representation of a motor vehicle 30 having a cooling arrangement 16 according to a further exemplary embodiment of the invention. The cooling arrangement 16 can in particular be designed as already described above for FIG. 2 and FIG. 1. Here again, the cooling circuit 24 is shown, the components of which are the cooling device 14 for the battery 12, the coolant pump 26 and, for example, a coolant reservoir 32. In this example, a further cooling device 34 for a further component 36 is shown in the cooling circuit 24. The further component 36 can be a high-voltage consumer, for example power electronics for the electric motor, a converter device or similar. The further cooling device 34 can be designed as a cooling plate, heat exchanger or similar. The cooling circuit 24 therefore comprises two sub-paths, a first sub-path 24a, in which the cooling device 14 is arranged, and a second sub-path 24b, in which the cooling device 34 for the further component 36 is integrated. A valve 38a, 38b is also assigned to each path 24a, 24b. This allows the cooling performance for the respective cooling devices 14, 34 to be controlled, in particular even in normal operation in absence of a faul state F. Furthermore, a control device 40 is also shown here as part of the cooling arrangement 16. This is designed to control both the pump 26 and the valves 38a, 38b. If a faul state F now occurs, which is connected with a thermal runaway of a battery cell 10a of the multiple battery cells 10 included in battery 12, this can be detected by a detection device 42. The detection device 42 can signal the detected faul state F to the control device 40 accordingly. In the course of detecting the faul state F, the battery 12 can be disconnected from the rest of the high-voltage vehicle electrical system 46 by controlling a disconnecting device 44, for example also by means of the control device 40. The disconnecting device 44 can be provided, for example, by high-voltage contactors 44, which are opened during the disconnection. The control device 40 itself, as well as the pump 26 and other optional components, can continue to be supplied with electricity via the low-voltage vehicle electrical system 48 and an energy storage 50 included therein. This now advantageously also makes it possible for the control device 40 to control the pump 26 in order to activate it. It can also control the valve 38a to open it. The control of the disconnecting device 44, the valves 38a, 38b, and the pump 26 by the control device 40 is illustrated in FIG. 3 by dashed arrows. As a result, coolant can flow through the cooling device 14, whereby the heat can be transported away from the battery 12 and can be absorbed by other components of the cooling circuit 24. Optionally, the control device 40 can also control the valve 38b in order to open it in order to additionally integrate the further component 36 into the cooling circuit 24, in particular via their associated cooling device 34. The heat removed from the battery 12 can thus be absorbed by various others components and devices, in particular the entire motor vehicle 30. An excessively strong heating of neighboring cells 10 of the thermal runaway cell 10a can thus advantageously be prevented or delayed for a significantly longer time.

Overall, the examples show how the invention provides the use of the thermal capacity of the cooling system to prevent thermal propagation. At the same time, the heat input into the cooling system can be used in such a way that only the lowest possible heat input via the cooling system into the neighboring cell or cells occurs.

The invention claimed is:

1. A method for cooling a battery of a motor vehicle, which comprises multiple battery cells, by a cooling device through which a coolant can flow, as part of at least one cooling circuit through which the coolant can flow, which comprises
    circulating, with at least one coolant pump in an active state, the coolant present in the at least one cooling circuit in the cooling circuit;
    detecting, with a detection device, a thermal runaway of at least one of the battery cells of the battery based upon a voltage drop of a cell voltage;
    controlling, with the control device the at least one coolant pump after the detection of the thermal runaway of at least one of the battery cells of the battery such that the at least one coolant pump is activated or continues to be operated in the active state.

2. The method according to claim 1, further comprising:
    supplying, the control device and the at least one coolant pump with energy in the active state by a low-voltage on-board electrical system of the motor vehicle.

3. The method according to claim 1, further comprising:
    supplying, with the battery, energy to a high-voltage on-board electrical system of the motor vehicle in at least one operating state that is different from the thermal runaway, wherein the control device controls the at least one coolant pump for activation or continued operation when the thermal runaway is detected, regardless of a current activation state of the high-voltage on-board electrical system.

4. The method according to claim 1, further comprising:
    deactivating, with the control device, the high-voltage on-board electrical system by controlling a disconnecting device for electrically disconnecting the battery from the high-voltage on-board electrical system when the thermal runaway is detected.

5. The method according to claim 1, further comprising:
    coupling, with the control device, at least one component to the at least one cooling circuit after detection of the thermal runaway, so that through the coolant, which circulates in the at least one cooling circuit, more heat can be transferred to the at least one component than in the uncoupled state.

6. The method according to claim 1, further comprising:
    coupling, with the control device, the at least one component to the at least one cooling circuit after detection of the thermal runaway depending on a current temperature of the component to the cooling circuit only when the at least one component can absorb heat from the coolant, when the current temperature of the component meets a predetermined criterion, which consists in the current temperature of the component being lower than a current temperature of the coolant.

7. The method according to claim 1, further comprising:
coupling, with the control device, the at least one component to the at least one cooling circuit by controlling at least one first valve device in a first state in which a cooling circuit part of the at least one cooling circuit assigned to the component, through which cooling circuit part coolant can flow, when the at least one coolant pump is active.

8. The method according to claim 1, wherein the at least one cooling circuit has a first cooling circuit, which includes the cooling device, and a second cooling circuit, to which the at least one component is assigned, and further comprising:
coupling, with the control device, detection of the thermal runaway, the at least one component to the at least one cooling circuit by controlling at least one second valve device in a first state, in which the first and second cooling circuits are fluidly connected to one another.

9. A cooling arrangement comprising:
a battery which comprises multiple battery cells;
a cooling circuit through which a coolant can flow, wherein the cooling circuit comprises a cooling device through which the coolant can flow for cooling the battery and at least one coolant pump which is configured, in an active state of the at least one coolant pump, to circulate a coolant located in the cooling circuit in the cooling circuit;
a detection device configured to detect a thermal runaway of at least one of the battery cells of the battery based upon a voltage drop of a cell voltage;
a control device configured to control the at least one coolant pump after the detection of the thermal runaway so that the at least one coolant pump is activated or continues to be operated in the active state.

10. A motor vehicle with the cooling arrangement according to claim 9.

11. The method according to claim 2, further comprising:
supplying, with the battery, energy to a high-voltage on-board electrical system of the motor vehicle in at least one operating state that is different from the thermal runaway; and
controlling, with the control device, the at least one coolant pump for activation or continued operation when the thermal runaway is detected, regardless of a current activation state of the high-voltage on-board electrical system.

12. The method according to claim 2, further comprising:
deactivating, with the control device, the high-voltage on-board electrical system by controlling a disconnecting device for electrically disconnecting the battery from the high-voltage on-board electrical system when the thermal runaway is detected.

13. The method according to claim 3, further comprising:
deactivating, with the control device, the high-voltage on-board electrical system by controlling a disconnecting device for electrically disconnecting the battery from the high-voltage on-board electrical system when the thermal runaway is detected.

14. The method according to claim 2, further comprising:
coupling, with the control device, at least one component to the at least one cooling circuit after detection of the thermal runaway, so that through the coolant, which circulates in the at least one cooling circuit, more heat can be transferred to the at least one component than in the uncoupled state.

15. The method according to claim 3, further comprising:
coupling, with the control device, at least one component to the at least one cooling circuit after detection of the thermal runaway, so that through the coolant, which circulates in the at least one cooling circuit, more heat can be transferred to the at least one component than in the uncoupled state.

16. The method according to claim 4, further comprising:
coupling, with the control device, at least one component to the at least one cooling circuit after detection of the thermal runaway, so that through the coolant, which circulates in the at least one cooling circuit, more heat can be transferred to the at least one component than in the uncoupled state.

17. The method according to claim 2, further comprising:
coupling, with the control device, the at least one component to the at least one cooling circuit after detection of the thermal runaway depending on a current temperature of the component to the cooling circuit only when the at least one component can absorb heat from the coolant, when the current temperature of the component meets a predetermined criterion, which consists in the current temperature of the component being lower than a current temperature of the coolant.

18. The method according to claim 3, further comprising:
coupling, with the control device, the at least one component to the at least one cooling circuit after detection of the thermal runaway depending on a current temperature of the component to the cooling circuit only when the at least one component can absorb heat from the coolant, when the current temperature of the component meets a predetermined criterion, which consists in the current temperature of the component being lower than a current temperature of the coolant.

19. The method according to claim 4, further comprising:
coupling, with the control device, the at least one component to the at least one cooling circuit after detection of the thermal runaway depending on a current temperature of the component to the cooling circuit only when the at least one component can absorb heat from the coolant, when the current temperature of the component meets a predetermined criterion, which consists in the current temperature of the component being lower than a current temperature of the coolant.

20. The method according to claim 5, further comprising:
coupling, with the control device, the at least one component to the at least one cooling circuit after detection of the thermal runaway depending on a current temperature of the component to the cooling circuit only when the at least one component can absorb heat from the coolant,
when the current temperature of the component meets a predetermined criterion, which consists in the current temperature of the component being lower than a current temperature of the coolant.

* * * * *